US 6,671,679 B2

United States Patent
Griffin et al.

(10) Patent No.: US 6,671,679 B2
(45) Date of Patent: Dec. 30, 2003

(54) OPTIMIZING DATABASE ENTRIES

(75) Inventors: James Griffin, London (GB); Say Beng Tan, Singapore (SG)

(73) Assignee: NCR Corporation, Dayton, OH (US)

( * ) Notice: Subject to any disclaimer, the term of this patent is extended or adjusted under 35 U.S.C. 154(b) by 407 days.

(21) Appl. No.: 09/780,695

(22) Filed: Feb. 9, 2001

(65) Prior Publication Data
US 2002/0062308 A1 May 23, 2002

(30) Foreign Application Priority Data
Feb. 15, 2000 (GB) .............................................. 0003307

(51) Int. Cl.$^7$ .............................................. G06F 17/30
(52) U.S. Cl. .................... 707/2; 707/4; 707/6
(58) Field of Search ...................... 707/2, 4, 6; 600/300

(56) References Cited
U.S. PATENT DOCUMENTS
5,935,060 A * 8/1999 Iliff ............................ 600/300

OTHER PUBLICATIONS

Insua et al., "Sensitivity Analysis in Statistical Decision Theory: A Decision analytic View", Sep. 9, 1995 at www.g-bhap.com/fulltext/free/T970006F164.htm.*

Vignaux, "Utility", Mar. 12, 1999, at www.mcs.vuw.ac.nz/courses/O . . . Notes/utilityLectures/utility.html.*

"Utility", G. A. Vignaux, Mar 12, 1999, at www.mcs.vuw.ac.nz/courses/O . . . Notes/utilityLectures/utility.html.

"Sensitivity analysis in statistical decision theory: a decision analytic view", D. Rios Insuna et al., Sep 9, 1995, at www.gbhap.com/fulltext/free/T970006F164.htm.

* cited by examiner

Primary Examiner—Kim Vu
Assistant Examiner—Gwen Liang
(74) Attorney, Agent, or Firm—Priest & Goldstein PLLC

(57) ABSTRACT

A data processing apparatus is operated to optimize the amount of information represented by entries in a database. The operation comprises forming prior distributions over the parameters of entries in the database and subjecting a potential entry for the database to a process of evaluation. The evaluation includes, (a) sampling parameters from the prior distributions, (b) calculating a utility function from the samples and from the potential entry, and (c) calculating a utility value from the utility function. The process of evaluation is repeated for each of a plurality of further potential entries and the potential entry having the highest calculated utility value is selected.

12 Claims, 3 Drawing Sheets

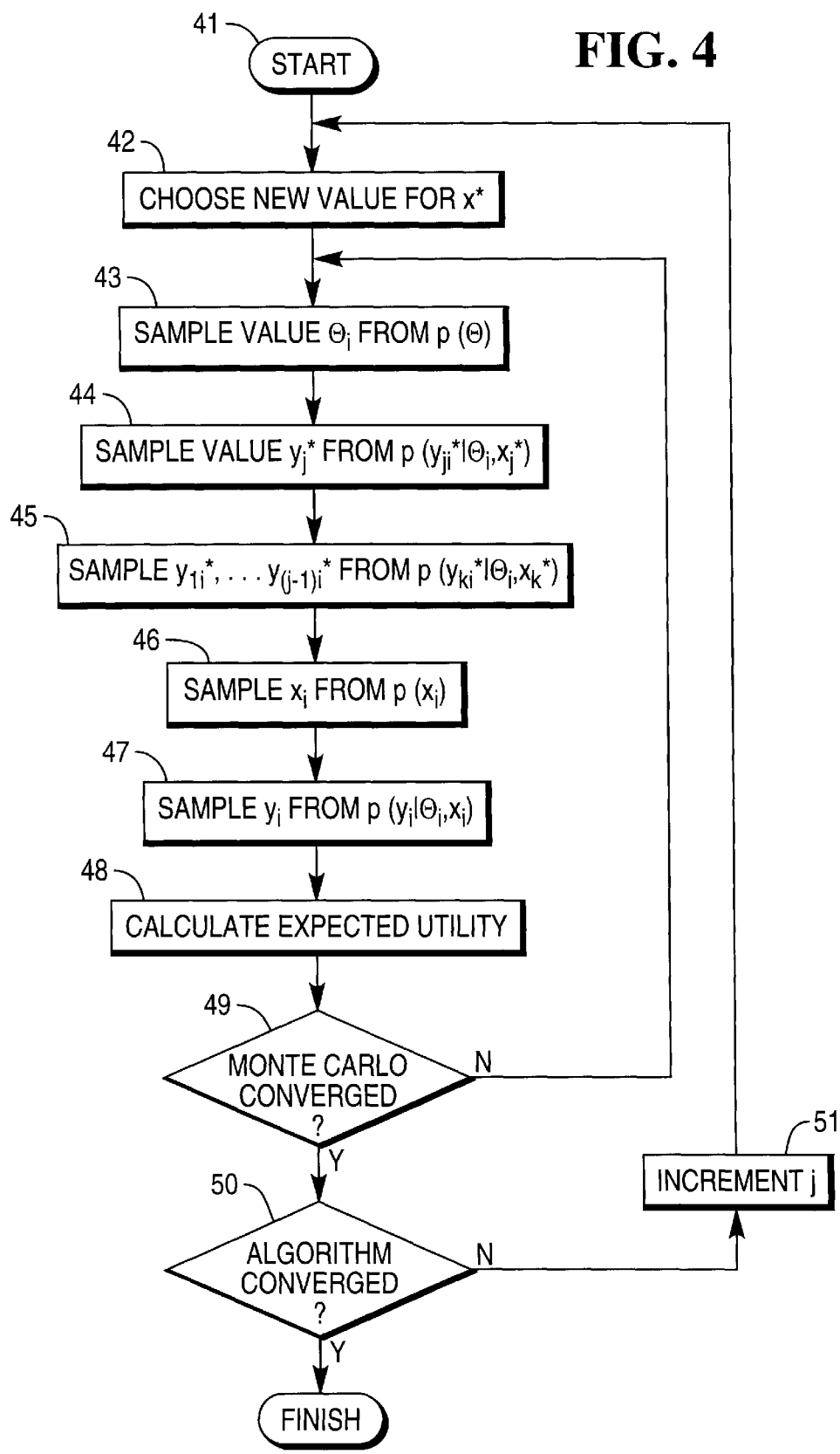

OPTIMIZING DATABASE ENTRIES

BACKGROUND OF THE INVENTION

The present invention relates to a method and apparatus to optimize the amount of information represented by entries in a database. The invention has particular application to databases in which the entries represent both the attributes of individuals who access the database for advice and the advice given to those individuals.

The Internet provides a channel for the supply of advice in a wide variety of fields, all of which require expert advice not normally available to most members of the general public. The advice available through this means can include advice on medical problems and advice on the purchase of financial products such as mortgages, pensions and shares.

The expert advice available by accessing an automated system must necessarily be trustworthy. It is therefore important to the supplier of information and advice to obtain accurate predictions for the best advice to be given to any particular customer. Statistical prediction methods typically involve fitting a statistical model using some database or other data source. The database will have entries relating to the attributes of a collection of people or data subjects, real or imaginary, and the respective advice given by an expert or group of experts for each person or data subject.

The database must necessarily be compiled to include a large number of people or data subjects and one or more experts are required to suggest a particular piece of advice (e.g. the purchase of a particular financial product) that is considered best suits the needs of each individual in the database. Advice for any future individual will then be made by reference to the database.

The size of the database may be limited by including a selection only of all the possible entries that could be included in the database. Such a limitation in size is advantageous in improving the efficiency of the database. A database of limited size may however be less accurate in respect of the advice to be given to individuals accessing the database. The accuracy depends upon the optimal selection of the entries to be included in the database.

SUMMARY OF THE INVENTION

It is an aim of the present invention to optimize the information represented by the entries in a database.

According to the present invention, there is provided a method of operating a data processing apparatus to optimize the amount of information represented by entries in a database, the method comprising;
   forming prior distributions over the parameters of entries in the database;
   subjecting a potential entry for the database to a process of evaluation, the evaluation including;
      (a) sampling parameters from the prior distributions;
      (b) calculating a utility function from the samples and from the potential entry; and
      (c) calculating a utility value from the utility function;
   repeating the process of evaluation for each of a plurality of further potential entries; and
   selecting from the potential entries the one having the highest calculated utility value.

Further according to the present invention, there is provided a data processing apparatus to optimize the amount of information represented by entries in a database, the apparatus comprising;
   means forming prior distributions over the parameters of entries in the database;
   evaluating means for subjecting a potential entry for the database to a process of evaluation, the evaluation including;
      (a) sampling parameters from the prior distributions;
      (b) calculating a utility function from the samples and from the potential entry; and
      (c) calculating a utility value from the utility function;
   means to cause the evaluating means to repeat the process of evaluation for each of a plurality of further potential entries; and
   selecting means to select from the potential entries the one having the highest calculated utility value.

BRIEF DESCRIPTION OF THE DRAWINGS

The invention will now be described, by way of example, with reference to the accompanying drawings in which.

DETAILED DESCRIPTION

Figure 1:
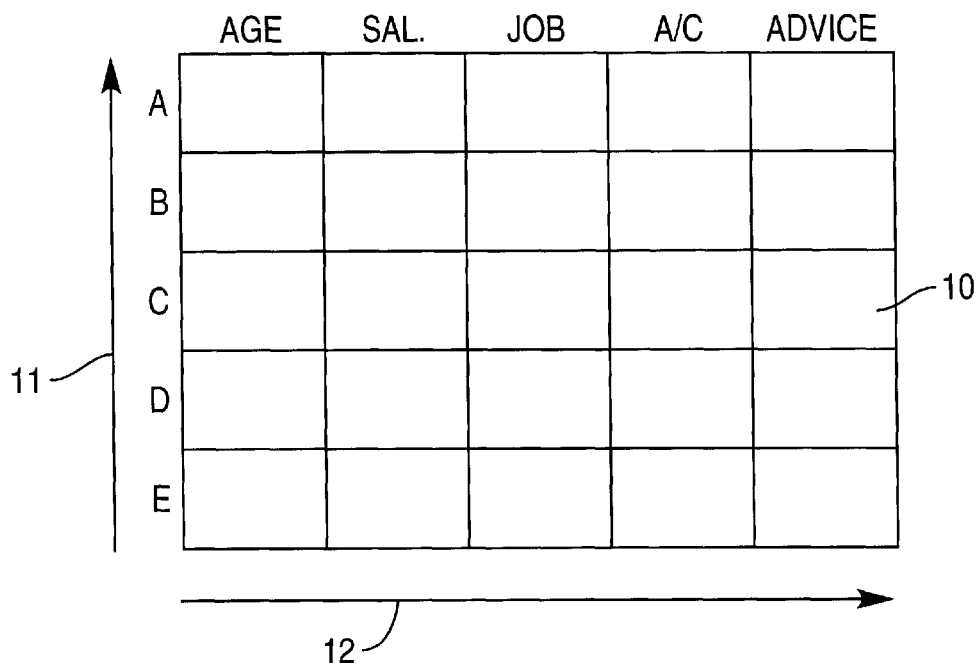
FIG. 1 is a diagram of a database of variables relating to a set of customers of a bank.

In FIG. 1, a database 10 concerns a set of customers of an enterprise such as a bank. The database 10 is shown in two dimensions arranged along a vertical axis 11 and a horizontal axis 12. The vertical axis 11 is subdivided to include fields for each of five customers A to E although it will be understood that in practice the database would have fields along the vertical axis for a multiplicity of customers far in excess of five. Each customer has attributes that include personal information such as age, type of job and salary and financial attributes such as the number and types of bank accounts, including investment accounts, deposit and current accounts and holdings of credit cards and finally the financial attributes relating to the type of pension arrangements, e.g. an occupational pension or a self-financed pension. The data in the database includes data values relating to quantifiable items and the data values relating to each customer may be thought of as a vector x containing the customer attributes. The database also includes a field including values relating to the advice given to each customer by one or more experts concerning the selection of a financial product. The financial product may be, for example, an insurance product, a further pension plan or an investment plan. The advice for each customer is represented as a string of numerical values identifying the details of the product advice.

Whilst only five fields of attributes for each customer are shown in FIG. 1, it will be understood that, in practice, provision would be made for a number of attributes for each customer far in excess of five. Furthermore, whilst only one field is shown for the advice given to each customer, in practice, provision would be made for a number of fields so as to cover the range of products on which expert advice is obtainable.

If sufficient storage space is available, the database may optionally include a time axis providing extra fields in which the customer attributes and the advice given are recorded as a succession of values at regular time intervals.

In order to set up an effective automated advisor service to be accessed remotely, for example over the internet, it is necessary first to compile a large database of either real or imaginary people that includes their personal attributes in the manner discussed already with respect to FIG. 1. One or more experts must then go through the database and make particular recommendations in respect of the advice to enter in the advice field for each person in the database. Advice for any future individual accessing the database will then be available by reference to the advice already stored. Clearly, the individuals in the database should be chosen so as to allow for the best predictions to be made for any future user. The decisions on which individuals to include in the database may be tackled using Bayesian inference.

Bayesian inference is characterized by the expression of uncertainty about all random quantities. In a Bayesian decision problem, the objective is to choose the "best" decision from a predefined set of possible decisions. The measure of which decision is the best is given by a utility function that attaches real-numbered values to all possible outcomes compared to the true state of the world. In the Bayesian approach, all knowledge about the true state of the world is held in the posterior distribution.

The utility function provides a measure of the amount of information provided by a particular person, whether real or imaginary, in the database. Using a Bayesian approach, the expected utility is always taken with respect to the state of the world. A model is required that provides accurate predictions for all potential users and so a further expectation is taken with respect to the beliefs about the potential customers. The beliefs about the attributes for a potential user are held in the distribution, $p(x)$, where x is a vector containing the user attributes. For given attributes x, then $p(y|x,y^*,x^*)$ is the distribution representing the updated beliefs about the right advice to give a user exhibiting these attributes after observing $x^*$ and $y^*$. Here $x^*$ and $y^*$ respectively represent the attributes of the people in the database 10 and the corresponding expert advice given to them. The two distributions $p(x)$, and $p(y|x,y^*,x^*)$ jointly hold the current beliefs about the state of the world. The beliefs about the advice an expert or group of experts would give to a person with attributes $x^*$ is expressed in the marginal distribution $p(y^*|x^*)$.

The expected utility has to be evaluated with respect to the beliefs about the state of the world and the next observation. Mathematically, this expectation can be expressed as follows;

$$U(x^*) = \int U(y,x,y^*,x^*) p(y|x, y^*,x^*) dy \, p(x) dx \, p(y^*|x^*) dy^*$$

where $U(x^*)$ is the expected utility value that should be maximized with respect to $x^*$ and $U(y,x,y^*,x^*)$ is the utility function. A large number of observations will need to be made and they may be made at the same time, sequentially or in batches.

The utility function may take a number of different forms since the invention is not limited to a particular form of utility function. The utility function must address the problem of inference and one example of a utility function that does this is the logarithmic divergency measure:

$$U(y, x, y^*, x^*) = \log \frac{p(y|x, y^*, x^*)}{p(y|x)}$$

This logarithmic divergency measure can only be used in a fully Bayesian framework. The invention may be applied in a non-Bayesian context in which case a utility function would have to be elicited from expert knowledge and may be of a simple mathematical form e.g. a quadratic loss utility. The quadratic loss utility takes the form:

$$U(y,x,y^*,x^*) = -(y - E(y|y^*,x^*))^2$$

As for the distributions $p(y|x)$ and $p(x)$, there are many possible ways to model these. One approach for $p(y|x)$ is to use a non parametric model such as a Gaussian process prior or a basis function model. Modeling $p(x)$ would require elicitation from experts and a mixture of normal distributions would be a particularly suitable form for $p(x)$.

Figure 2:
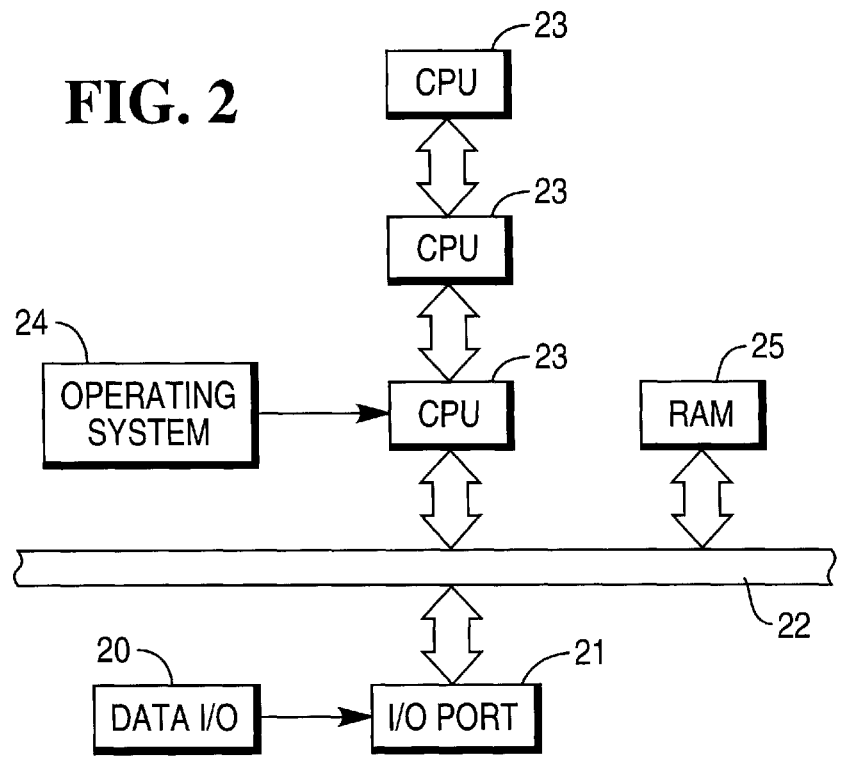
FIG. 2 shows data processing apparatus, according to the present invention, for predicting future values of the variables stored in the database of FIG. 1, and FIGS. 3 and 4 show operating steps in a method according to the present invention that employs the apparatus of FIG. 2.

Referring now to FIG. 2, a data processing apparatus is shown that provides a means for receiving the data in the database of FIG. 1. The data is entered by means of an I/O device 20 through an I/O port 21 for entry to a data bus 22. A group of central processing units (CPU) 23 are controlled by an operating system 24 to control the entry of data onto the data bus. A random access memory 25 is connected to the I/O bus 22 to receive and store data supplied by the bus 22.

In response to the entry, by means of the data I/O device 20, of the data representing the information in the different fields of the database 10 of FIG. 1, the parallel operating CPU's are programmed to enter the data into the memory 25. The data in the memory 25 is a set of data values representing each of the variables for each of the customers included in the database and the advice entered for each customer. The data are available to be processed in a series of processing operations as will be described.

Figure 3:
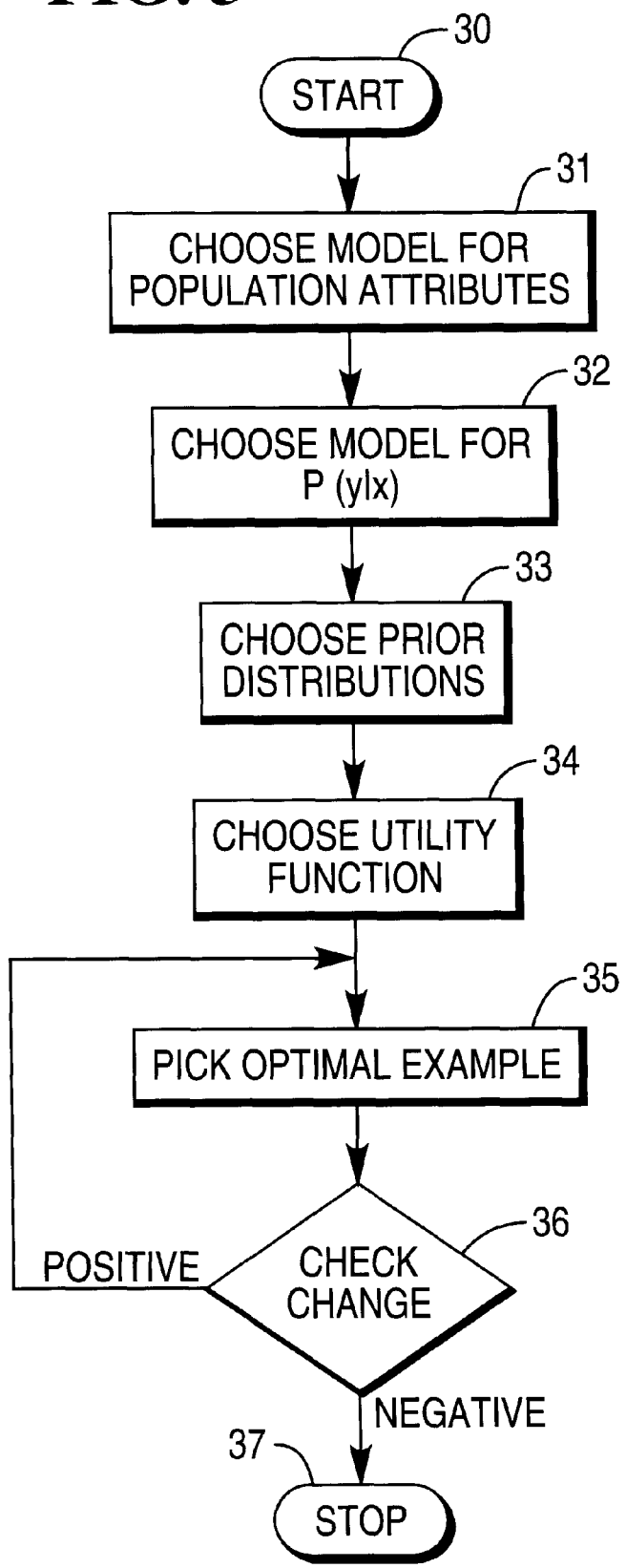

FIG. 3 provides a graphical overview of how the invention is implemented. From the start 30, a model for the distribution of the attributes of the population in the database is chosen in step 31. In step 32 a model is chosen for the distribution $p(y|x)$ and the prior distributions are chosen in step 33. A utility function is chosen in step 34. The choices represented by the steps 31 to 34 are entered into the data processing apparatus of FIG. 2 for subsequent use in operating on the data in the database stored in the memory 25. Continuing with the process in FIG. 3, in step 35 a choice is made of an optimal example of an individual for inclusion in the database. In addition, the utility value of the chosen individual is evaluated. A test is made in step 36 to determine whether the evaluation in step 35 provides a positive change compared to previous evaluations. If the test in step 36 is positive, the current evaluation is stored and the process loops back to repeat steps 35 and 36. When the process has evaluated all the optimal examples it will have maximized the expected utility. At this point the test in step 36 will be negative and the process is directed to the finish 37.

To maximize the expected utility as just explained with reference to FIG. 3, an appropriate optimizing algorithm is employed as will be further explained with reference to FIG. 4. The optimizing algorithm may employ simulated annealing or conjugate gradient methods. In choosing the examples for inclusion in the database, a sequential approach is used where the expected utility for the next example is maximized assuming the previous examples are fixed, i.e. choose $x_j^*$ assuming that $x_1^*, \ldots, x_{j-1}^*$ have already been chosen. The expected utility is maximized across all the possible values of the user attributes. At each iteration of the optimizing algorithm, the expected utility must be calculated. In some forms of prior distribution, some or all the integration can be performed analytically while in other situations none of the integrals can be calculated analytically and the integral must then be approximated numerically. A generic numerical strategy will now be described although it will be understood that the invention is not limited to this generic numerical strategy.

The following equation is useful in explaining the numerical strategy:

$$P(y|x,y^*,x^*) = \int p(y|\theta,x,y^*,x^*)p(\theta|y^*,x^*)d\theta \quad (1)$$

where the integration is over the appropriate range of values for θ. Substituting equation (1) into the expected utility and rearranging;

$$U(x^*) = \int U(y,x,y^*,x^*)p(y|x,y^*,x^*)dy\,p(x)dx\,p(y^*|x^*)dy^*$$

$$= \int U(y,x,y^*,x^*)p(y|\theta,x,y^*,x^*)p(\theta|x^*,y^*)d\theta\,dy\,p(x)dx\,p(y^*|x^*)dy^*$$

$$= \int U(y,x,y^*,x^*)p(y|\theta,x,y^*,x^*)p(\theta,y^*|x^*)d\theta\,dy\,p(x)dx\,dy^*$$

$$= \int U(y,x,y^*,x^*)p(y|\theta,x,y^*,x^*)p(x)p(y^*|\theta,x^*)p(\theta)d\theta\,dy\,dx\,dy^*$$

The numerical technique used to calculate the expected utility consists of Monte Carlo sampling where for some probability distribution p(x) and function g(x);

$$\int_{i=1}^{N} g(x)p(x)dx \approx 1/N \sum g(x_i)$$

for suitably large value of N and draws $x_1, \ldots x_N$ from the distribution p(x).

FIG. 4 is illustrative of the steps of operation employed in the apparatus of FIG. 2 to implement this numerical technique. From the start 41, j is set to zero and a choice is made in step 42 of a new value of $x_j^*$. A value of $\theta_i$ is sampled from the distribution p(θ) in step 43 and a sample value $y_j^*$ is taken from the distribution $p(y_{ji}^*|\theta_i,x_j^*)$ in step 44. In step 45, samples $y_{1i}^* \ldots y_{(j-1)i}$ are taken from the distribution $p(y_{ki}^*|\theta_i,x_k^*)$. A value of $x_i$ is sampled from the distribution $p(x_i)$ in step 46 and a value of $y_i$ is sampled from the distribution $p(y_i|\theta_i,x_i)$ in step 47. The sampled values and the current value of x* are used to calculate the expected utility value in the step 48. A test is conducted in step 49 to determine Monte Carlo convergence and if no convergence has occurred the process loops round to repeat the sampling steps 43 to 47 and the calculation step 48. Once convergence has occurred, the process moves on to step 50 to determine whether the algorithm has converged. If not, the process loops round to a step 51 where the value of j is incremented according to the relation j=j+1 and the process is re-entered at the step 42 to choose another value for x*.

What has been described is a method and apparatus for the optimization of the amount of information represented by the entries in the database. This has the benefit that a reduced size of database can be produced for a given level of accuracy.

What is claimed is:

1. A method of operating a data processing apparatus to optimize an amount of information represented by entries in a database, the method comprising:
   providing a plurality of potential database entries to be evaluated;
   forming prior distributions over attributes of entries in the database;
   subjecting a potential database entry from the plurality of potential database entries to a process of evaluation, the evaluation including:
   (a) sampling attributes from the prior distributions,
   (b) choosing a utility function based on the sampling and the potential database entry,
   (c) calculating a utility value from the utility function by using a Monte Carlo sampling technique, and
   (d) repeating steps of sampling and calculating for the potential database entry until Monte Carlo convergence has occurred;
   repeating the process of evaluation until each of the plurality of potential database entries is evaluated; and
   selecting one having a highest calculated utility value from the plurality of potential database entries.

2. A method as claimed in claim 1, wherein the utility function comprises a logarithmic divergency measure.

3. A method as claimed in claim 1, wherein the entries in the database relate to attributes of individuals and to respective advice information for those individuals.

4. A method as claimed in claim 3, wherein the prior distributions include a distribution representing beliefs about attributes of a potential individual to be included in the database.

5. A method as claimed in claim 4, wherein the distribution representing the beliefs about the attributes of a potential individual to be included in the database comprises a mixture of normal distributions.

6. A method of operating a data processing apparatus to optimize an amount of information represented by entries in a database, the method comprising:
   providing a plurality of potential database entries to be evaluated;
   forming prior distributions over attributes of entries in the database;
   subjecting a potential database entry from the plurality of potential database entries to a process of evaluation, the evaluation including:
   (a) sampling attributes from the prior distributions,
   (b) choosing a utility function based on the sampling and the potential database entry,
   (c) calculating a utility value from the utility function by using a Monte Carlo sampling technique, and
   (d) repeating steps of sampling and calculating for the potential database entry until Monte Carlo convergence has occurred;
   repeating the process of evaluation until each of the plurality of potential database entries is evaluated; and
   selecting one having a highest calculated utility value from the plurality of potential database entries,
   wherein the entries in the database relate to attributes of individuals and to respective advice information for those individuals,
   wherein the prior distributions include a distribution representing beliefs about attributes of a potential individual to be included in the database,
   wherein the utility value conforms to general expression:

$$U(x^*) = \int U(y,x,y^*,x^*)p(y|x,y^*,x^*)dy\,p(x)dx\,p(y'^*|x^*)dy^*$$

where the utility value is U(x*), the utility function is U(y,x,y*,x*), a first of the prior distributions is represented by p(y|x,y*,x*), a second of the prior distributions is represented by a third of the prior distributions is represented by p(y*|x*), the x* and the y* represent respectively the attributes of individuals in the database and corresponding advice information for those individuals and the x and y represent respectively the attributes of potential individuals to be included in the database and corresponding advice information for those potential individuals.

7. A data processing apparatus for optimizing an amount of information represented by entries in a database, the method comprising:

means for providing a plurality of potential database entries to be evaluated;

means for entering prior distributions over attributes of entries in the database;

evaluating means for subjecting a potential database entry from the plurality of potential database entries to a process of evaluation, the evaluating means including:
(a) means for sampling attributes from the prior distributions,
(b) means for choosing a utility function based on the sampling and the potential database entry,
(c) means for calculating a utility value from the utility function by using a Monte Carlo sampling technique, and
(d) means for repeating steps of sampling and calculating for the potential database entry until Monte Carlo convergence has occurred;

means for causing the evaluating means to repeat the process of evaluation until each of the plurality of potential database entries is evaluated; and selecting means for selecting one having a highest calculated utility value from the plurality of potential database entries.

8. The data processing apparatus as claimed in claim 7, wherein the utility function comprises a logarithmic divergency measure.

9. The data processing apparatus as claimed in claim 7, wherein the amount of information in entries that relate to attributes of individuals and to respective advice information for those individuals is optimized.

10. The data processing apparatus as claimed in claim 9, wherein the means for entering prior distributions includes means for entering a distribution representing beliefs about attributes of a potential individual to be included in the database.

11. The data processing apparatus as claimed in claim 10, wherein the means for entering a distribution representing the beliefs about the attributes of a potential individual to be included in the database comprises a mixture of normal distributions.

12. A data processing apparatus for optimizing an amount of information represented by entries in a database, the apparatus comprising:

means for providing a plurality of potential database entries to be evaluated;

means for entering prior distributions over attributes of entries in the database;

evaluating means for subjecting a potential database entry from the plurality of potential database entries to a process of evaluation, the evaluating means including:
(a) means for sampling attributes from the prior distributions,
(b) means for choosing a utility function based on the sampling and the potential database entry,
(c) means for calculating a utility value from the utility function by using a Monte Carlo sampling technique, and
(d) means for repeating steps of sampling and calculating for the potential database entry until Monte Carlo convergence has occurred;

means for causing the evaluating means to repeat the process of evaluation until each of the plurality of potential database entries is evaluated; and selecting means for selecting one having a highest calculated utility value from the plurality of potential database entries wherein the amount of information in entries that relate to attributes of individuals and to respective advice information for those individuals is optimized, wherein the means for entering prior distributions includes means for entering a distribution representing beliefs about attributes of a potential individual to be included in the database, wherein the utility value conforms to general expression:

$$U(x^*) = \int U(y,x,y^*,x^*) p(y|x,y^*,x^*) dy p(x) dx p(y'^*|x^*) dy^*$$

where the utility value is $U(x^*)$, the utility function is $U(y,x,y^*,x^*)$, a first of the prior distributions is represented by $p(y|x,y^*,x^*)$, a second of the prior distributions is represented by $p(x)$, a third of the prior distributions is represented by $p(y^*|x^*)$, the $x^*$ and the $y^*$ represent respectively the attributes of individuals in the database and corresponding advice information for those individuals and the x and they represent respectively the attributes of potential individuals to be included in the database and corresponding advice information for those potential individuals.

* * * * *

UNITED STATES PATENT AND TRADEMARK OFFICE
CERTIFICATE OF CORRECTION

PATENT NO. : 6,671,679 B2
DATED : December 30, 2003
INVENTOR(S) : Griffin, J. E. and Tan ,S. B.

It is certified that error appears in the above-identified patent and that said Letters Patent is hereby corrected as shown below:

<u>Column 6,</u>
Line 56, after "by" insert --p (x), --.
Line 60, after "and" second occurrence, delete "they" and insert -- the y --.

<u>Column 8,</u>
Line 40, after "and" second occurrence, delete "they" and insert -- the y --.

Signed and Sealed this

Eighteenth Day of May, 2004

JON W. DUDAS
*Acting Director of the United States Patent and Trademark Office*